United States Patent

Eby

[11] 4,141,341
[45] Feb. 27, 1979

[54] SOLAR HEATING PANEL
[76] Inventor: Arden T. Eby, Box 268, Redmond, Oreg. 97756
[21] Appl. No.: 784,380
[22] Filed: Apr. 4, 1977
[51] Int. Cl.² ............................................. F24J 3/02
[52] U.S. Cl. .................................... 126/271; 126/270
[58] Field of Search ................ 126/270, 271; 237/1 A
[56] References Cited

U.S. PATENT DOCUMENTS

| | | | |
|---|---|---|---|
| 2,594,232 | 4/1952 | Stockstill | 126/271 |
| 3,961,619 | 6/1976 | Estes et al. | 126/271 |
| 3,972,317 | 8/1976 | Gallagher | 126/271 |
| 4,036,207 | 7/1977 | Bouse | 126/271 |
| 4,046,135 | 9/1977 | Root | 126/271 |
| 4,055,162 | 10/1977 | Gonzales | 126/271 |

*Primary Examiner*—Kenneth W. Sprague
*Attorney, Agent, or Firm*—Chernoff & Vilhauer

[57] ABSTRACT

A solar heating panel includes a unitary rectangular shell having a low thermal conductivity urethane foam liner sandwiched between inner and outer fiberglass boxes. The inner box is impregnated with a dark coloring and has spaced raised support and expansion ridges extending traversely across its bottom. An integral lip located at the top of the shell stiffens its sidewalls and mounts a thermally insulated window comprised of paired sheets of glass separated by a sealed space. A thermal collector assembly adapted for placement within the shell on the support and expansion ridges is comprised of a serpentine heat transfer coil and an adjacent planar collector sheet which are integrally formed by joinder of a plurality of stamped unitary modular units dimensioned to be received within the collector shell. An inlet and an outlet pass from opposite ends of the heat transfer coil out of the shell through openings in its sidewalls.

2 Claims, 4 Drawing Figures

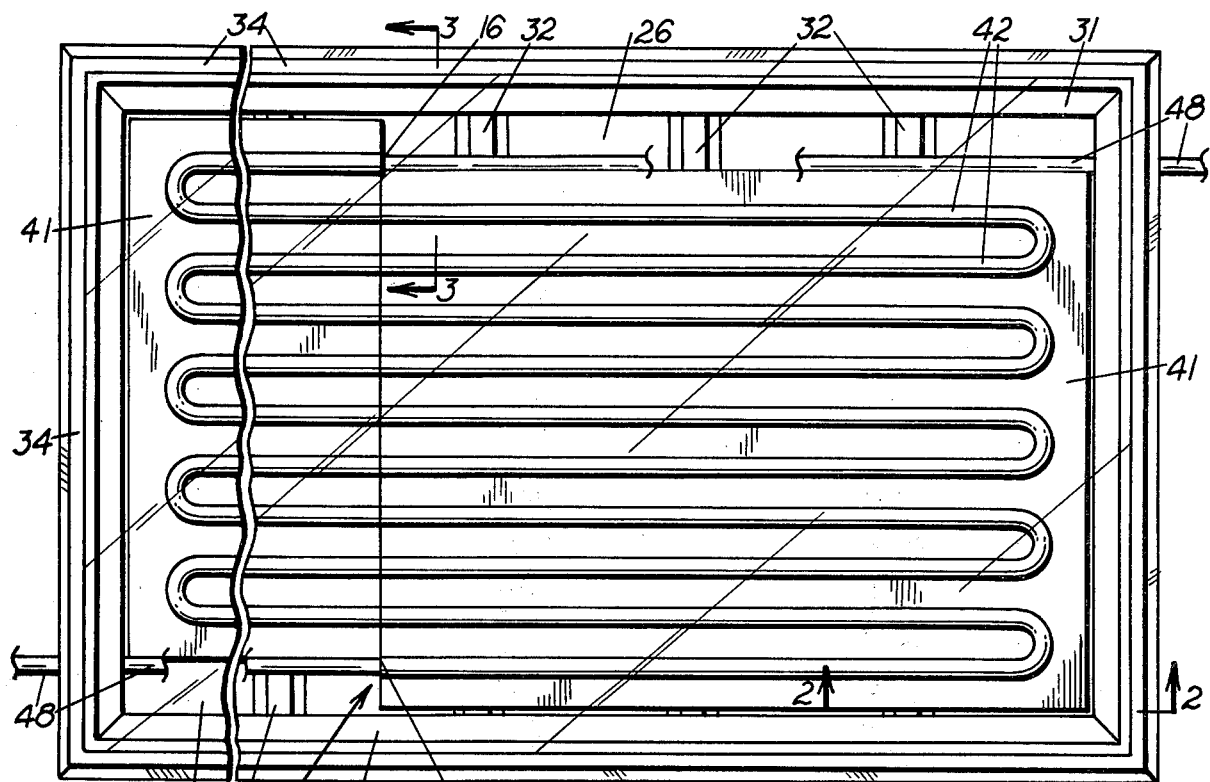
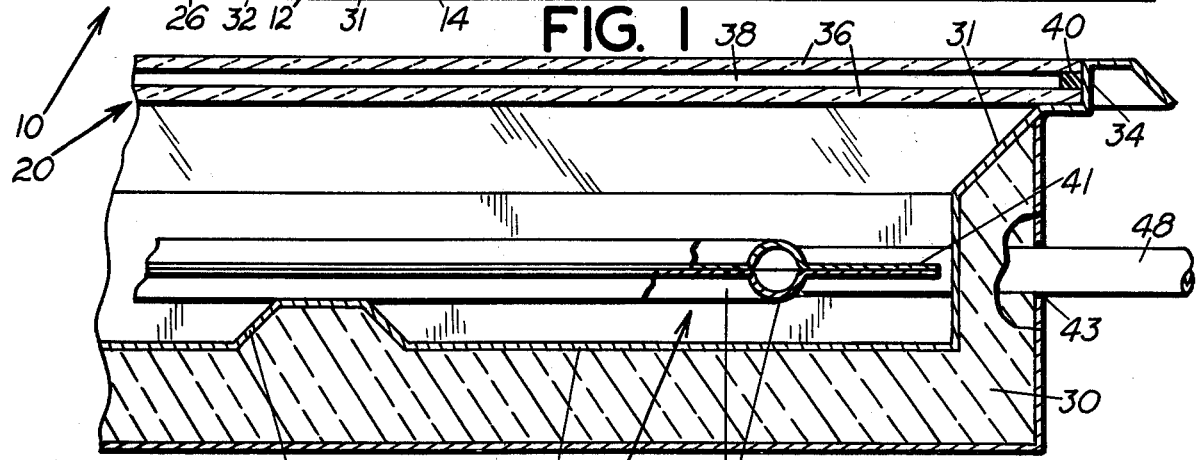
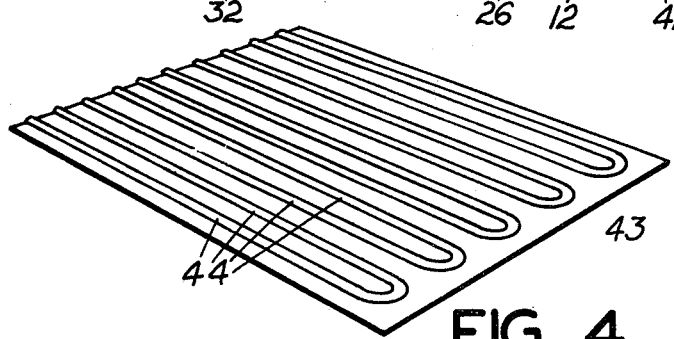
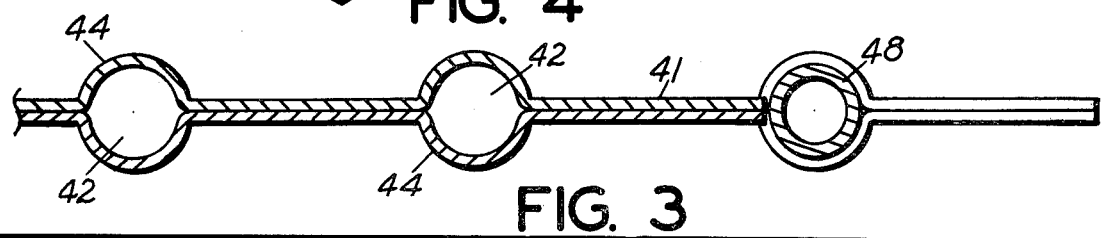

SOLAR HEATING PANEL

BACKGROUND OF THE INVENTION

This invention relates to a solar panel and in particular to a solar panel formed from interchangeable unitary modular components.

Panels for solar heating of fluid flowing through a heat transfer coil in a glass enclosed shell are known in the prior art. Typical of such prior art devices are: Wheeler, U.S. Pat. Nos. 1,753,227, Eaton, 1,802,635, Cline, 2,202,756, Abbot, 1,801,710 and Wheeler, 1,971,242. However, in order to insulate them properly the shells of these prior art devices all are of the multi element type. Accordingly, they are not generally susceptible to mass production and thus are expensive to fabricate. In addition they are not fluid tight and will not retain the heat transfer fluid if the coil placed in them breaks. Also if they are to be colored on their inside surfaces, to achieve high absorbance characteristics, the coloration must be applied externally, such as by painting, and in time must be replaced due to fading or peeling.

The heat transfer coils used in the prior art solar panels generally comprise tubing which either is bent to form a continuous path through the shell, such as in Wheeler and Cline, or interconnects spaced manifolds in multiple parallel paths, such as in Eaton and Cline. Accordingly, the heat transfer coils also are not susceptible to machine mass production for lower initial cost and for providing a uniform size coil which interchangeably fits in a shell. If a collector sheet is to be placed downwardly adjacent of the coil to increase its effieciency, such as for example in Cline, the sheet generally is joined to the coil by soldering, again eliminating the possibility of mass producing a uniform interchangeable assembly. Also, the solder joint often breaks due to the repeated thermal expansion and contraction of the assembly, necessitating repeated repairs.

SUMMARY OF THE INVENTION

The solar heating panel of the present invention is comprised of a molded unitary collector shell and a modular thermal collector assembly including an integral heat transfer coil and collector sheet.

The shell comprises inner and outer fiberglass boxes having a closed cell urethane foam liner sandwiched inbetween. Ridges formed in the inner box support the thermal collector assembly and allow for expansion and contraction of the shell upon respective heating and cooling without damage or breakage of the shell. The top margin of the inner box is sloped outwardly for obtaining the maximum exposure of the panel to solar rays, and a lip which is integral with the top of the shell extends outwardly from its periphery to stiffen the sidewalls of the shell and releasably carry a window of thermally insulated glass.

The collector assembly is formed by joining four modular units, each formed by stamping a plurality of U-shaped depressions in a planar plate. Two of the units are reversed and joined in a back-to-back set to form a plurality of U-shaped passageways, and then two of the resulting sets are joined end-to-end with each loop offset from its opposed loop to form a continuous serpentine coil.

It is a primary object of the present invention to provide a solar panel of the class described which is readily produced in interchangeable modular units.

It is a further object of the present invention to provide such a solar panel having a collector shell which is water tight.

It is a further object of the present invention to provide such a solar panel having a collector shell whose insulating properties are unaffected by exposure to moisture.

It is a further object of the present invention to provide such a solar panel having a collector shell with selected coloration impregnated therethrough for providing controllable long lived thermal absorbancy characteristics.

It is a still further object of the present invention to provide such a solar panel having a thermal collector assembly wherein the heat transfer coil and collector sheet are unitary for maintenance free use.

The foregoing objectives, features and advantages of the present invention will be more readily understood upon consideration of the following detailed description of the invention taken in conjunction with the accompanying drawings.

BRIEF DESCRIPTION OF THE DRAWINGS

FIG. 1 is a foreshortened plan view showing a preferred embodiment of the solar panel of the present invention.

FIG. 2 is a fragmentary sectional view taken on the line 2—2 of FIG. 1, partially broken away to show hidden detail.

FIG. 3 is a fragmentary sectional view taken on the line 3—3 of FIG. 1.

FIG. 4 is a perspective view of one of the modular units used to form the thermal collector assembly shown in FIGS. 1, 2 and 3.

DETAILED DESCRIPTION THE PREFERRED EMBODIMENT

Referring to FIG. 1 of the drawings, the solar heating panel of the present invention is generally comprised of a rectangular collector shell 10, having located therein an integral thermal collector assembly 12 with an inlet 14 and an outlet 16 extending out of the shell for circulation of a fluid through the collector assembly. The open top of the shell is covered with a window 20 which efficiently admits solar radiation while preventing heat transfer loss from the heated panel due to either radiation or convection.

As is best shown in FIG. 2 collector shell 10 is an integral assembly comprising an inner box 26 and outer box 28 with an insulating liner 30 sandwiched inbetween. The inner and outer boxes are fiberglass and are impregnated respectively with dark and light colored pigmentation. Accordingly, the inner box has a high coefficient of thermal absorbance and the outer box has a high coefficient of thermal reflectance as will be more fully explained later. The upper margin 31 of the inner box, adjacent to its joinder with the outer box is sloped outwardly to more efficiently permit sun light to strike the thermal collector assembly therein. Liner 30 preferably is a closed cell urethane foam having insulating characteristics which are unaffected by the presence of moisture. In the embodiment illustrated, shell 10 is fabricated by forming the inner box, laying sheets of the liner therein, and then forming the outer box over the top of the liner sheets, thus bonding all three layers into an integral assembly.

Located at spaced intervals transversely in the bottom of the shell are support and expansion ridges 32. In the embodiment illustrated they are shown as truncated trapazoidal steps which are formed in the bottom of the inner box. Surrounding the periphery of the shell is an irregularly shaped lip 34 which stiffens the sides of the shell and which mounts window 20.

Window 20, FIG. 2, includes paired sheets of plate glass 36 separated by a space 38 to reduce conductive heat loss from the top of the shell. The sheets of glass are sealed in a frame 40 which is adapted for snug communication with lip 34 in a manner to prevent ambient air from entering the shell and from entering space 38.

Openings 43 are located diagonally each other at opposite sides of the shell allowing access through the shell to inlet 14 and outlet 16.

Thermal collector assembly 12 which is located in collector shell 10 atop support and expansion ridges 32, includes a planar collector sheet 41 having a serpentine heat transfer coil 42 integral therewith. The thermal collector is comprised of four unitary modular units 45 best illustrated in FIG. 4. Each modular unit includes a planar plate 43 having a plurality of U-shaped depressions 44 stamped therein which are disposed side-by-side and have parallel legs opening into one edge of the plate.

The thermal collector assembly is formed by joining two of the plates together in sets of mating reversed pairs creating U-shaped tubular passageways from depressions 44, FIG. 3. Two of the resulting sets then are joined end-to-end in an offset manner with the legs of the opposite U-shaped passageways aligned for forming the continuous heat transfer coil 42 having an outlet 14 at one end and an inlet 16 at the other end, with the remainder of the plate serving as collector sheet 41. The modular units are joined together by means such as soldering and are painted black in order to increase their thermal absorbance. Lengths of tubing 48, which are connected respectively to inlet 14 and outlet 16, pass out of the respective openings 43 in the shell.

In operation, the thermal collector assembly 12 is placed in collector shell 10 atop support and expansion ridges 32, and window 20 is installed in lip 34. It will be noted that due to the construction of the shell the thermal collector assembly is sealed from ambient air, and if openings 43 are sealed around tubing 48 the shell will be water tight also, preventing spillage of the heat transfer fluid in the event a leak occurs in heat transfer coil 42. The distal ends of tubing 48 are connected to an appropriate heating system through which a fluid is pumped, and the shell is placed in position to be exposed to the sun's rays. The shell can either be oriented horizontally as shown, or it can be angled in the direction of the sun for more efficient operation, however, in either orientation the sloped margin 31 of inner box 26 allows for more efficient capture of solar energy by the panel. When sunlight strikes the solar panel the dark color of inner box 26 and the thermal collector assembly absorbs a high percentage of the light incident thereon, for efficient operation of the unit. Also since the color of the inner box is impregnated into the fiberglass it is permanent and does not peel or require repainting. In addition, insulating liner 30 in cooperation with thermally insulated window 20 retains a large portion of the absorbed solar energy in the box. As the shell becomes heated, support and expansion ridges 32 permit the intermediate portions of the bottom of the inner box to thermally expand without cracking.

While the collector shell is shown only with the thermal collector assembly of the present invention illustrated, it will be appreciated that conventional heat transfer coils also can be utilized in it, and conversely that the thermal collector assembly can be used with a conventional collector shell. In the event of the former, the dark color of inner box 26 is fully utilized and support and expansion ridges 32 allow air circulation around the coil.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A solar heating panel comprising:
   (a) a collector shell having a bottom, side walls, and being open on the top, including inner and outer fiberglass boxes and a closed cell urethane liner sandwiched therebetween all bonded into an integral assembly;
   (b) said inner box including a plurality of upwardly extending, inverted, truncated, V-shaped expansion ridges extending transversely thereacross;
   (c) a heat transfer coil configured for placement within said collector shell having an inlet and outlet passing through said collector shell;
   (d) a collector sheet adapted for fitting in said collector shell intermediately adjacent to said expansion ridges and said heat transfer coil for collecting solar energy and transmitting it to said heat transfer coil; and
   (e) a window enclosing said top of said collector shell.

2. The solar heating panel of claim 1 including an integral lip circumscribing the top margin of said collector shell, said lip comprising:
   (a) window retention means for attaching said window to said collector shell, including an L-shaped extension of said inner box having an upstanding leg which terminates substantially co-planar with said window;
   (b) support means for suspending said panel from a support frame, including a planar rim which extends radially outwardly from the extremity of said upstanding leg; and
   (c) a flashing extending radially outwardly and downwardly from the outer extremity of said rim.

* * * * *